United States Patent Office 3,508,018
Patented Apr. 21, 1970

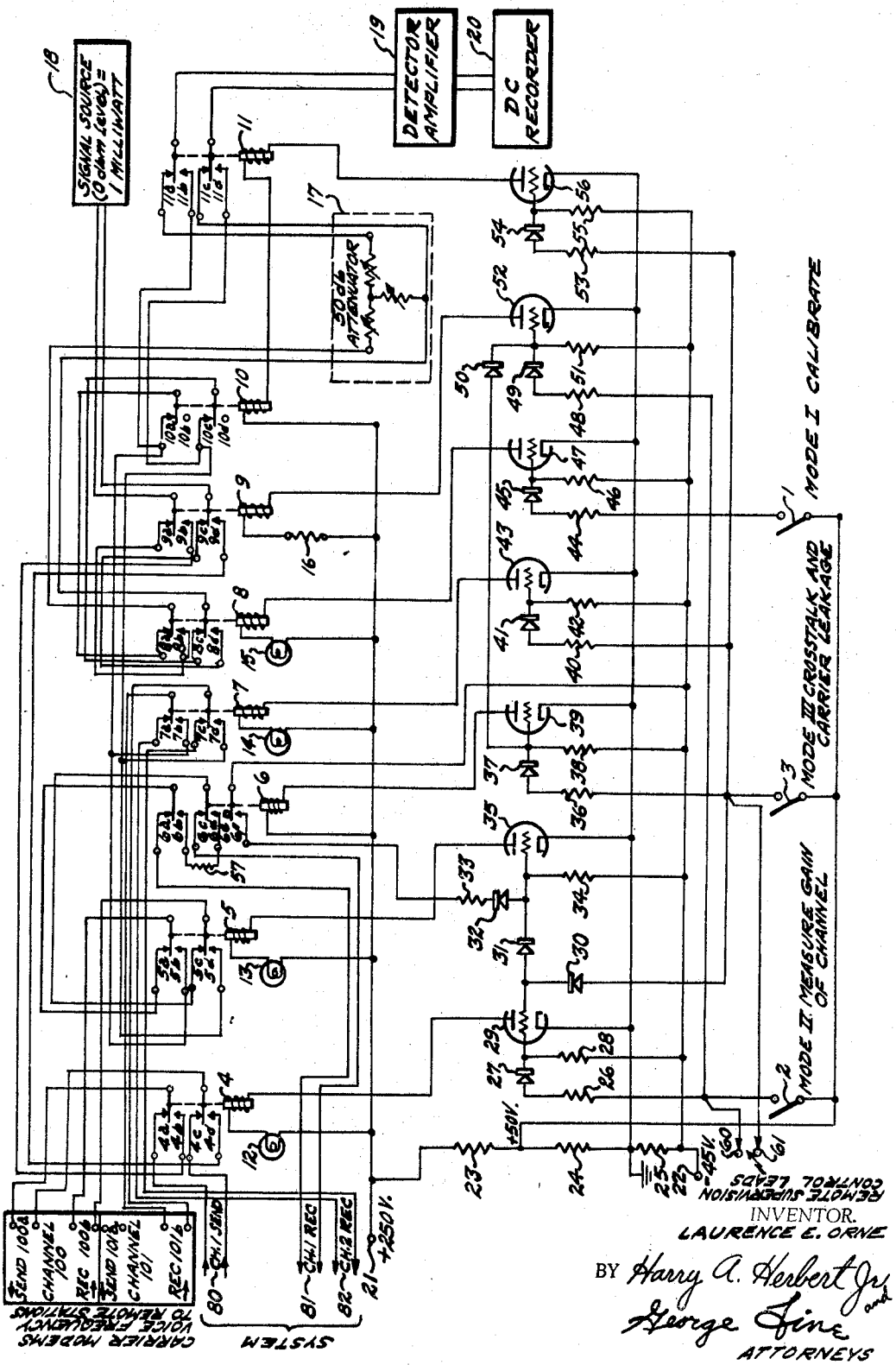

3,508,018
TESTING CIRCUITRY FOR MULTI-CHANNEL COMMUNICATION SYSTEM
Laurence E. Orne, Billerica, Mass., assignor to the United States of America as represented by the Secretary of the Air Force
Filed June 2, 1966, Ser. No. 554,900
Int. Cl. H04b 3/46
U.S. Cl. 179—175.3       2 Claims

ABSTRACT OF THE DISCLOSURE

An integrated testing circuit for a multi-channel communication system including circuitry for calibrating, monitoring and measuring the signal quality, constancy, crosstalk and leakage of a plurality of frequency allocated communication channels derived from a single carrier frequency wherein the testing circuit utilizes voltage responsive relays and indicators built into component lines of the communication system.

---

This invention relates to circuitry for testing a multi-channel communication system and more particularly to circuitry providing a calibrated test reference signal to be utilized for measuring individual channel gain and also crosstalk between channels.

In the prior art, testing of a multi-channel communication system included manual patching of circuits during operational maintenance periods. Testing of equipment functions have been made on a manual basis where test time has been costly and highly skilled craftsmen are required. There has also been utilized semi-automatic transmission testing but in some cases pen recorders with one hundred tracks have been used, while in other cases separate data recorders are applied to special circuits.

In accordance with the present invention, there is provided circuitry for calibrating, monitoring and measuring the signal quality and constancy in each of a plurality of frequency allocated channels derived from a single carrier frequency supplying an automatic telecommunications system serving numerous subscribers. The concept embraces the use of voltage-responsive relays and indicators built into component lines of the system, in lieu of reliance upon super-imposed test instrumentation of the type requiring special handling by special maintenance technicians on each occasion requiring its use.

An object of the present invention is to provide circuitry integrated with a multi-channel communication for supplying a calibrated test reference signal to be utilized for measuring the gain of each channel and the crosstalk between channels.

Another object of the present invention is to provide circuitry integrated with a multi-channel communication system for supplying a calibrated test reference signal that is recorded and then utilized to measure the gain of each channel and crosstalk between channels.

Various other objects, advantages, and features of novelty which characterize the invention are pointed out with particularity in the claims annexed hereto and forming a part hereof. However for a better understanding of the invention, its advantages, and objects attained by its use, reference should be had to the subjoining drawing, which forms a further part hereof, and to the accompanying descriptive matter, in which there is illustrated and described a preferred embodiment of the invention.

Under normal multi-channel communication system operation, the output of the voice frequency (modemus) of a four-wire carrier terminal equipment operates over the normal contacts of relay 4 for send circuit 80 and over the normal contacts of relays 5 and 6 for receive circuits 81 and 82.

For testing purposes of the multi-channel system, the automatic transmission measuring circuitry of the present invention operates in three modes and are (I) calibrate, (II) measurement of individual channel gain, and (III) measurement of crosstalk and residual carrier leakage.

With reference to the single drawing, there are shown switches 1, 2, and 3 which are normally in the open position. Relays 4–11, as shown in the drawing, are in their normal positions so that relay 4 has its contacts at position 4a and 4c, relay 5 at 5a and 5c, relay 6 at 6a, 6c, and 6e, relay 7 at 7a and 7c, relay 8 at 8a and 8c, relay 9 at 9a and 9c, relay 10 at 10a and 10c, and relay 11 at 11a and 11c.

Now again referring to aforementioned calibration, Mode I, in operation tube 47 is normally nonconducting with switch 1 in the normally open position thus permitting only −45 volts to be applied to the grid by way of grid resistor 46. Upon closing switch 1, +50 volts is applied to the grid of tube 47 by way of current limiting resistor 44 and isolation diode 45, thereby causing tube 47 to conduct. It is to be noted the +50 volts is provided by applying +250 volts to terminal 21 and −45 volts to terminal 22, terminal 21 and terminal 22 being interconnected by series resistors 23, 24, and 25.

One end of the winding of relay 8 is connected to the plate of tube 47 and the other end to +250 volts by way of supervisory indicator lamp 15. Tube 47 serves as the driver amplifier for relay 8. Upon conduction in tube 47, relay 8 is activated so that contact position thereof is changed from 8a to 8b and from 8c to 8d. Simultaneously supervisory indicator lamp 15 is illuminated. The signal output from signal source 18 is passed through normally positioned contacts 9a and 9c of relay 9 to contacts 8b and 8d of relay 8 to 50 db variable attenuator 17 to normally positioned contacts 11a and 11c to detector amplifier 19 and finally to direct current (DC) recorder 20. Signal source 18 may be a 1000 cycle AC generator which is adjusted initially to have a 1 milliwatt output. Attenuator 17 is of the calibrated type and is adjusted for a 50 db attenuation which precisely compensates for the gain of detector amplifier 19. It is to be noted that for purposes of calibration DC recorder 20 is adjusted to indicate zero db, corresponding to the 1 milliwatt output of signal source 18 or zero dbm into a 600 ohm impedance termination. Thus there is provided in Mode I operation a calibrated test reference signal which has been recorded prior to utilization for Mode II operation. The illumination only of supervisory indicator lamp 15 indicates that calibration Mode I is taking place.

Now referring to Mode II, measurement of individual channel gain, for example channel 100 being a representative channel of a multi-channel communication system, after the calibration operation switch 1 is replaced to the normally open position and switch 2 is changed from the normally open position to the closed. Tube 29, which was normally nonconductive by virtue of −45 volts being applied to the grid thereof by way of grid resistor 28, becomes conductive since +50 volts is applied to the grid thereof by way of current limiting resistor 26 and isolation diode 27. The positive 50 volts is also applied to the grid of normally nonconducting tube 35 by way of isolation diode 31 to cause tube 35 also to conduct. Simultaneously +50 volts is applied to normally nonconducting tube 52 by way of current limiting resistor 48 and isolation diode 49 also causing tube 52 to conduct. Tubes 29, 39 and 52 serve as driver amplifiers for relays 4, 5, and 9, respectively. One end of the winding of relay 4 is connected to the plate of tube 29 and the other end to +250 volts by supervisory indicator lamp 12. One end of the winding of relay 5 is connected

3 to the plate of tube 35 and the other end to +250 volts by supervisory indicator lamp 13. One end of the winding of relay 9 is connected to the plate of tube 52 and the other end to +250 volts by way of current limiting resistor 16.

Upon the closing of switch 2, tubes 29, 35, and 52 become conductive to cause current flow in the windings of relays 4, 5, and 9, respectively. Thereupon supervisory indicator lamps 12 and 13 are illuminated, indicating channel 100 gain measurements are being made. Simultaneously therewith relays 4, 5, and 9 contacts shift from normal positions 4a, 4c; 5a, 5c; and 9a, 9c; to 4b, 4d; 5b, 5d; and 9b, 9d; respectively. The one milliwatt output signal from signal source 18 passes through contacts 9b, 9d of relay 9 to contacts 4b, 4d of relay 4 to the send terminals of the voice modern channel 100 which consists of send and receive terminals to be connected to a remote station.

At the remote station the send and receive terminals associated with channel 100 may be connected together upon the receipt of a supervisory control signal orginating when switch 2 is closed to provide +50 volts at terminal 60 which is transmitted to the remote station. The output signal from receiver terminals 100b of channel 100 is fed through contacts 5b, 5d of relay 5 to contacts 10a, 10c of relay 10 to contacts 8a, 8c of relay 8 through previously adjusted 50 db attenuator 17 to contacts 11a, 11c of relay 11 through amplifier detector 19 for measurement on DC recorder 20. Thus, the prior adjusted and recorded calibrated test reference signal and the presently measured signal are utilized to provide the channel gain. There are shown only channels 100 and 101 but as many more channels as desired may be included in the multichannel communication system.

Now referring to Mode III operation which provides cross-talk and carrier leakage measurements between channels, switch 2 is changed from the closed to normally open position and switch 3 from normally open to the closed position. Thus, +50 volts is applied to the grid of normally nonconducting tube 39 by way of current limiting resistor 36 and isolation diode 37. Tube 39 thereby becomes conductive. Tube 39 then serves as the driver amplifier for relay 6. The contacts of relay 6 shift from 6a, 6c, and 6e to 6b, 6d, and 6f thus placing 600 ohm, nonconductive resistor 57 across receiver terminals 100b of channel 100 by way of contacts 6b, 6d of relay 6; and contacts 5a, 5c of relay 5.

Relay 5 meanwhile remains in its normal position because −45 volts is applied to the grid of tube 35 by way of contact 6f of relay 6 and resistor 33 and diode 32, thus retaining tube 35 in a nonconductive state. Tube 29 changes from a nonconductive state to a conductive state as +50 volts is applied to the grid thereof by way of diode 30. When tube 29 becomes conductive relay 4 changes from the normally positioned contacts 4a, 4c to contacts 4b, 4d. Simultaneously +50 volts is applied to the grid of tube 52 by way of switch 3, current limiting resistor 36, diode 3 and diode 50. Tube 52 becomes conductive and actuates relay 9 so that the contacts thereof change from 9a, 9c to 9b, 9d. Thus the 1 milliwatt output signal from signal source 18 is fed to send terminals 100a of channel 100.

Still further in Mode III operation, when switch 3 is closed +50 volts is applied to the grid of tube 56 by way of switch 3, current limiting resistor 53, and isolation diode 54. Tube 56 becomes conductive and serves as the driver amplifier for relays 10 and 11 because the windings of relays 10 and 11 are connected in series between the plate of tube 56 and +250 volts. Upon activation of relays 10 and 11 contacts 10a, 10c and 11a, 11c shift to contacts 10b, 10a and 11b, 11d, respectively, thereby removing attenuator 17 from the input of detector amplifier 19.

Upon the aforementioned closure of switch 3, +50 volts supervisory control voltage is also provided at

4 terminal 61 which is fed to the remote station to control the interconnection thereat of the send and receive terminals associated with channel 100. Any crosstalk or carrier leakage occurring in the receive portion of channel 101 is fed to input of the detector amplifier to be then measured and recorded on DC recorder 20.

The feeding of the crosstalk and carrier leakage from the receive terminals of channel 101 to detector amplifier 19 is accomplished by the activation of relays 7 and 11 upon the closure of switch 3. Positive 50 volts is applied to the grid of nonconductive tube 43 by way of current limiting resistor 40 and diode 41 to provide conduction in tube 43. Tube 43 is the amplifier driver for relay 7, and upon conduction of tube 43 the contacts of relay 7 change from 7a, 7c to 7b, 7d. Positive 50 volts also is applied to the grid of nonconducting tube 56 by way of current limiting resistor 53 and diode 54, thereby providing conduction in tube 56. Upon conduction relay 11 changes contacts thereof from 11a, 11c to 11b, 11d. Thus the receiver terminals 101b of channel 101 are interconnected to the input of detector amplifier 19. It is to be noted that for Mode III operation, supervisory indicator lamps 12 and 14 are illuminated.

For purposes of this description, circuit control has been limited to measuring crosstalk and carrier leakage in channel 101 as induced from channel 100. If desirable, more channels may be added by a proportionate addition of relay circuits.

In a summary of the operation of switches 1, 2, and 3, it is emphasized that in Mode I switch 1 is closed and switches 2 and 3 are open. In Mode II, switch 2 is closed and switches 1 and 3 are open. In Mode III, switch 3 is closed and switches 1 and 2 are open. These mode switches are operated in the above-described sequence and may be cam operated by any conventional rotary shaft or may be remote controlled by an electronic switching arrangement. The time duration of measurement may be determined by the sequential closure of switches 1, 2, and 3.

The present invention extends system testing to remote locations and reduces the number of supervisory personnel. System test of any one or group of communication links may be made from one attended location and requires no coordination at distant locations. The control of distant locations with supervisory signals provide the required automation for system testing. Minor modifications of the above-described testing circuitry will provide for automatic monitoring of channel performance via subscriber signals.

What I claim is:

1. Apparatus for testing a multi-channel communication system, each channel having an associated remote station with send and receive terminals thereat comprising first, second, and third switches normally open, first, second, third, fourth, fifth, sixth, seventh and eighth relay, circuits said first relay circuit being actuated upon closing said first switch for a predetermined time, said second, third and fourth relay circuits being actuated upon opening of said first switch and the closing of said second switch for a predetermined time, said second, third, fifth, sixth, seventh and eighth relay circuits being actuated upon opening said second switch and closing said third switch for a predetermined time, means to generate an alternating current test reference signal having a preselected value, a variable calibrated attenuator receiving said alternating current test reference signal, a detector amplifier receiving the output of said attenuator, a direct current recorder receiving the output of said detector amplifier for a first measurement and recordation, said attenuator being adjusted to exactly compensate for the gain of said detector amplifier, a first supervisory indicator lamp being illuminated during said first measurement and recordation, said first supervisory indicator lamp being connected in series relationship with said first relay circuit, means to feed said alternating current test reference signal to said send terminals of a preselected channel upon said actuation of said second and third relay circuits, means to provide a first supervisory control signal upon said closing of said second switch for transmission to said associated remote station of said preselected channel to permit connecting together of said receive and send terminals located thereat, means to feed the output signal from said receive terminals of said preselected channel to said direct current recorder by way of said variable attenuator and said detector amplifier for a second measurement and recordation to determine the gain of said preselected channel, second and third supervisory indicator lamps in series relationship with said third and fourth relay circuits, respectively, said second and third supervisory lamps being illuminated upon said actuation of said third and fourth relay circuits, respectively, means to feed said alternating current test reference signal to said send terminals of said preselected channel upon actuation of said second and third relay circuits, means to generate and transmit a second supervisory control signal to said associated remote station to permit the connecting together of said send and receive terminals located thereat, said second supervisory control signal being provided in the form of a positive voltage upon said closing of said third switch, means to feed the output signal from the receive terminals of a channel adjoining said preselected channel to said direct current recorder for a third measurement and recordation by way of said detector amplifier upon said actuation of said seventh and eighth relay circuits, means to remove said variable calibrated attenuator for measurement and recordation purposes upon said actuation of said sixth and seventh relay circuits, and a fourth supervisory indicator lamp in series relationship with said eighth relay circuits being illuminated upon said actuation of said eighth relay circuit.

2. Apparatus for testing a multi-channel communication system, each channel having an associated remote station and each channel and remote station having send and receive terminals comprising means to generate an alternating current test reference signal having a preselected magnitude, means to feed said test reference signal to a direct current recorder for a first measurement and recordation by way of a variable, calibrated attenuator in series with a detector amplifier, said attenuator being adjusted to precisely compensate for the gain of said detector amplifier, first means to feed said test reference signal to said send terminals of a preselected channel of said multi-channel communication system subsequent to said first measurement and recordation, first means to transmit a first supervisory control signal to said associated remote station to signal for a connection of said receive and send terminals located thereat, said first supervisory control signal being simultaneous with feeding said test reference signal to said send terminals, means for feeding the output signal from said receive terminals of said preselected channel to said direct current recorder by way of said series arrangement of said variable attenuator and said detector amplifier for a second measurement and recordation, said first and second measurement and recordation being utilized to determine the gain, second means to feed said test reference signal to said send terminals of said preselected channel subsequent to said second measurement and recordation, second means to transmit a second supervisory signal to said remote station to signal for a connection of said receive and send terminals located thereat, means to position a preselected load across said receive terminals of said preselected channel simultaneously with said transmission of said second supervisory signal, and means simultaneously with said second supervisory signal to feed the induced output signal from the receive terminals of a channel adjoining said preselected channel to said direct current recorder to determine crosstalk.

References Cited

UNITED STATES PATENTS

| 2,254,601 | 9/1941 | Felch | 179—175.3 |
| 2,324,215 | 7/1943 | Kinsburg | 324—57 |
| 2,908,862 | 10/1959 | Patchell | 324—73 |

KATHLEEN H. CLAFFY, Primary Examiner

T. W. BROWN, Assistant Examiner

U.S. Cl. X.R.

324—73